Dec. 12, 1961     A. KASER     3,012,631

FILTER BREATHER

Filed Sept. 29, 1958

ARTHUR KASER
INVENTOR.

BY Lawrence J. Winter
Atty.

United States Patent Office 3,012,631
Patented Dec. 12, 1961

3,012,631
FILTER BREATHER
Arthur Kaser, Plainfield, N.J., assignor to Purolator Products, Inc., Rahway, N.J., a corporation of Delaware
Filed Sept. 29, 1958, Ser. No. 764,084
4 Claims. (Cl. 183—34)

The present invention relates to an air breather device for eliminating the oil from fumes which escape from a closed compartment in which the oil is used as a lubricant, and to prevent dirt from entering with air breathed into the oil compartment from a point outside thereof.

One object of the present invention is to provide a filter breather to eliminate the oil from fumes escaping from a closed compartment by condensing the oil vapors and leading them back into the compartment.

Another object of the present invention is to remove dirt from air sucked into the oil compartment through the breather.

A further object of the present invention is to provide a paper compounded filter element for removing dirt from air breathed into an oil compartment housing gears, gear mechanism or the like while at the same time preventing oil particles carried by vapors breathed out of the compartment from clogging the paper compounded filter element.

A still further object of the present invention is to provide a filter breather assembly for preventing dirt from entering the closed space in which a gear mechanism is housed, and means for condensing the oil from fumes breathed out of the space.

Figure 1:
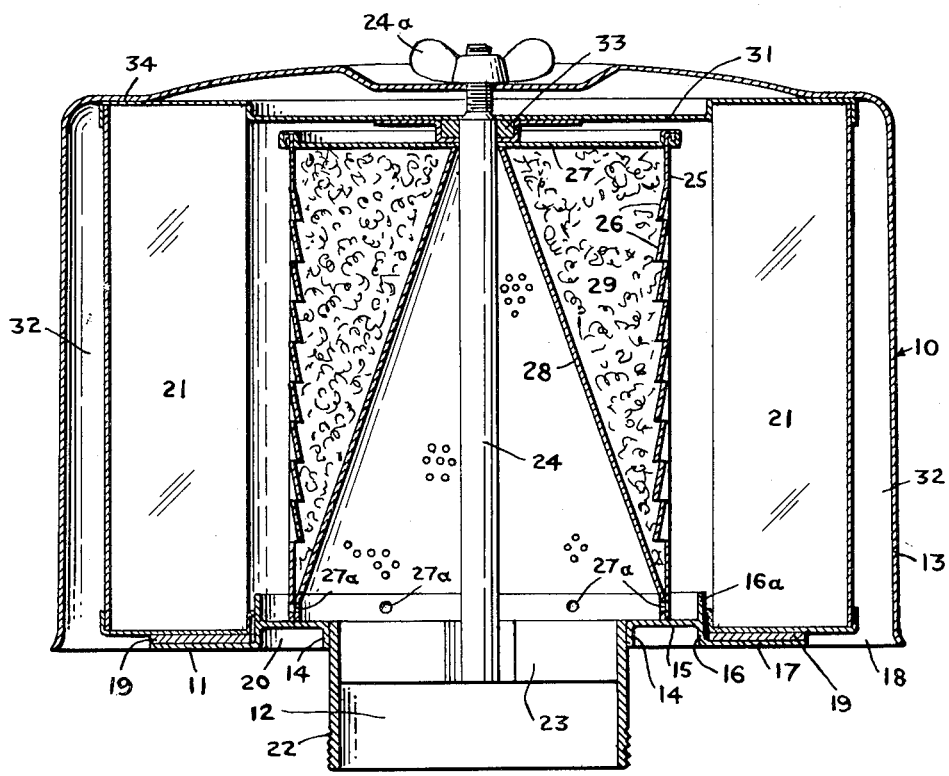
Figure 2:
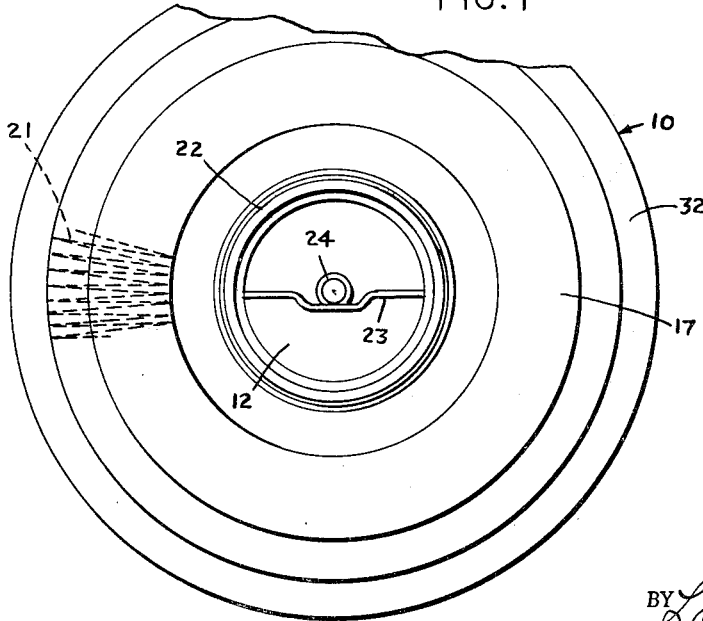

The invention will be better understood from the following description when considered in connection with the accompanying drawing from a part thereof and in which:

FIG. 1 is a side elevational view in section of the filter breather of the present invention, and FIG. 2 is a fragmentary bottom plan view of the filter breather.

Referring to the drawings, the reference numeral 10 designates the filter breather of the present invention comprising an annular base member 11 having a central opening 12 therein, and a cylindrical cover member 13 open at the bottom end.

Base member 11 comprises a center ring 14 flanged outwardly at 15 in a horizontal direction and then vertically downwardly as at 16. The rim portion of 11 extends horizontally at 17 to form a seat for a filter and is spaced from the wall of cover member 13 to form an annular air at 16a in alignment with 16 and formed integral with the inlet opening 18 therebetween. A resilient annular gasket 19 is seated on 17. An upturned flange or lip is provided at 16a in alignment with 16 and formed integral with the base member to provide a trough adjacent opening 12 for condensed oil. The configuration of base member 11 formed by sections 14, 15 and 16 provides an annular indentation or recess 20 below the trough.

An annular pleated paper filter element 21 impregnated with phenolic resin is disposed on gasket 19 for preventing any dirt from being breathed with air into the gear mechanism box, not shown, with which the assembly is associated.

A threaded pipe 22 extends below flange 14 and is secured thereto by welding or the like. A cross bar 23 is disposed in pipe 22 and has a bolt member 24 secured thereto that extends above cover member 13 and is provided with a wing nut 24a threaded thereon to hold the assembly together.

An oil fume eliminator is supported on flange 15 comprising an outer cylindrical metallic member 25 having inwardly extending louvers 26 in the wall thereof closed at the top by a cover 27 rolled over 25. The bottom of member 25 opens into central opening 12. An inverted cone 28 made of perforated sheet metal is disposed within member 25 and has its opposite ends joined to cover 27 and the lower edge of member 25. If desired, the cone may also be made of woven metal cloth. It will be noted that the outside diameter of member 25 and cone 28 are smaller than lip 16a so that any condensed oil dripping from them will fall into the trough formed by 15 and 16a and be returned through apertures 27a to pipe member 22. The space or compartment 29 formed between cone 28 and the wall of 25 is filled with non-woven fibrous material such as "Dynel," "Nylon" or the like that may be easily cleaned of oil or dirt deposited thereon by swishing in gasoline or kerosene.

The upper end of filter 21 is provided with a circular disc or grommet 31 to seal off the space within the filter element and prevent air entering inlet 18 and the air passage indicated as 32 from by-passing the filter. A gasket 33 is provided in disc 31 where bolt 24 passes therethrough. The periphery of cover member 10 is provided with a flat annular portion 34 for seating against the upper end of the filter element.

In operation, pipe member 22 is threaded onto a gear mechanism box, not shown, which usually contains a reduction gear or gear train which is running in oil. As the gear train rotates or operates, the oil within the gear box becomes hot due to friction and is also splashed around. Some of this oil will become separated from the main body of liquid and become vaporized. The heat within the gear box will cause the air therein to expand at this time, while when the mechanism is not running the gear box and air therein will cool so that there is a continuous expansion and contraction of the air within the box and consequently a change in the air pressure therein. The air will pass or breathe first in one direction and then in the other direction through pipe member 22 and the filter breather.

In accordance with the present invention, the air when leaving the gear box will first come in contact with cone 28 so that oil particles carried in the air will contact screen 28 and roll down it into the trough formed by 15 and 16a. Portions of the vaporized oil in the air will condense upon hitting the cold metal surface of 28 and also run down it and drip back into pipe 22. Other fumes are carried into the fibrous material 29 and deposited thereon while the clean air will pass out louvers 26 and filter 21 to the atmosphere. Member 25 serves to condense any vaporized oil remaining, the condensed oil running down the sides thereof into the trough.

Air breathed into the assembly passes through inlet 18 and any dirt contained therein is deposited on the outer surface of annular pleated paper filter element 21 so that only clean air will enter the gear box. The provision of the perforated metal member 28 and the fibrous material prevent any oil fumes from passing outwardly of the oil fume eliminator and contacting the inner surface of the paper filter so that the filter element will not become clogged by its pores becoming covered with oil.

Thus, the present invention provides a filter breather assembly in which the paper filter prevents any dirt from entering the gear box associated with the assembly while preventing any oil fumes containing mist or oil particles from contaminating the paper filter element and clogging the pores thereof to reduce its efficiency. It will also be observed that when the paper filter element becomes clogged with dirt, or fibrous filter material 29 or cone 28 become clogged, the entire assembly may be easily dismantled by removing wing nut 24 and cover 13 for replacement of the paper filter and cleaning of the fibrous filter material.

Inasmuch as various changes may be made in the form, location and relative arrangement of the several parts without departing from the essential characteristics of the invention, it will be understood that the invention is not to be limited except by the scope of the appended claims.

What is claimed is:

1. A filter breather asembly comprising a housing, an annular resin impregnated pleated paper filter element disposed therein, a louvered cylindrical member spaced inwardly of said air filter, a perforated cone shaped screen member spaced inwardly of the cylindrical member to provide a filter space therebetween, a mass of fibrous filter material disposed in said space, and a trough member disposed under said cylindrical and screen members and extending laterally beyond said members for collecting oil falling therefrom.

2. A filter breather assembly comprising a bottom having a central opening therein, an annular resin impregnated pleated paper filter seated thereon, a cylindrical cover member disposed over said filter having its sidewall spaced from said filter to provide an annular air opening therebetween, a louvered cylindrical member spaced inside said filter, a perforated inverted cone member spaced inwardly of said cylindrical member and having its ends secured thereto to provide a filter space, a mass of fibrous filter material disposed in said space, a circular baffle member on said bottom enclosing the lower end of said cylindrical and cone members and forming a trough, said cylindrical and cone members having apertures therein in communication with said trough and central opening, and means for holding said assembly together.

3. A filter breather assembly comprising a bottom having a central opening therein, an annular resin impregnated pleated paper filter seated thereon, a cylindrical cover over said filter having its sidewall spaced from said filter to provide an annular air opening therebetween, a louvered cylindrical member spaced inwardly of said filter, a perforated inverted cone member spaced inside said cylindrical member and joined thereto to provide a filter compartment, a fibrous mass of "Dynel" material in said compartment, a substantially vertical lip on said bottom extending around the outside lower end of said cylindrical and cone members, to provide a trough for collecting oil from said members, said cylindrical and cone members having apertures therein in communication with said trough and central opening, and means for securing said assembly together.

4. A filter breather assembly comprising a bottom having a central opening therein, an annular resin impregnated pleated paper filter seated thereon, a cylindrical cover over said filter having its sidewall spaced from said filter to provide an annular air opening therebetween, a louvered cylindrical member spaced inwardly of said filter, a perforated inverted cone member spaced inside said cylindrical member and joined there to provide a filter compartment, a fibrous mass of nylon material in said compartment, a substantially vertical lip on said bottom extending around the outside lower end of said cylindrical and cone members, to provide a trough for collecting oil from said members, said cylindrical and cone members having apertures therein in communication with said trough and central opening, and means for securing said assembly together.

References Cited in the file of this patent

UNITED STATES PATENTS

| 1,960,657 | Alexander | May 29, 1934 |
| 2,019,241 | Weiss | Oct. 29, 1935 |
| 2,122,111 | Poelman | June 28, 1938 |
| 2,171,752 | Kamrath | Sept. 5, 1939 |
| 2,562,331 | Phelps | July 31, 1951 |
| 2,574,053 | McGowan | Nov. 6, 1951 |
| 2,784,132 | Maisel | Mar. 5, 1957 |

FOREIGN PATENTS

| 660,864 | Great Britain | of 1951 |